US010356405B2

United States Patent
Novotny et al.

(10) Patent No.: US 10,356,405 B2
(45) Date of Patent: Jul. 16, 2019

(54) METHODS AND APPARATUSES FOR MULTI-PASS ADAPTIVE QUANTIZATION

(71) Applicant: Integrated Device Technology, Inc., San Jose, CA (US)

(72) Inventors: Pavel Novotny, Waterloo (CA); Eric C. Pearson, Conestogo (CA)

(73) Assignee: INTEGRATED DEVICE TECHNOLOGY, INC., San Jose, CA (US)

( * ) Notice: Subject to any disclaimer, the term of this patent is extended or adjusted under 35 U.S.C. 154(b) by 649 days.

(21) Appl. No.: 14/071,341

(22) Filed: Nov. 4, 2013

(65) Prior Publication Data

US 2015/0124870 A1 May 7, 2015

(51) Int. Cl.
| | |
|---|---|
| *H04N 19/124* | (2014.01) |
| *H04N 19/176* | (2014.01) |
| *H04N 19/136* | (2014.01) |
| *H04N 19/154* | (2014.01) |
| *H04N 19/192* | (2014.01) |

(52) U.S. Cl.
CPC ......... *H04N 19/124* (2014.11); *H04N 19/136* (2014.11); *H04N 19/154* (2014.11); *H04N 19/176* (2014.11); *H04N 19/192* (2014.11)

(58) Field of Classification Search
None
See application file for complete search history.

(56) References Cited

U.S. PATENT DOCUMENTS

| | | | |
|---|---|---|---|
| 5,333,012 A | 7/1994 | Singhal et al. | |
| 8,774,275 B2 | 7/2014 | Nilsson | |
| 2001/0021220 A1* | 9/2001 | Fert | H04N 19/172 375/240.03 |
| 2002/0141650 A1 | 10/2002 | Keeney et al. | |
| 2005/0152449 A1 | 7/2005 | Nemiroff et al. | |
| 2006/0204057 A1 | 9/2006 | Steinberg | |
| 2007/0076957 A1 | 4/2007 | Wang et al. | |
| 2007/0080965 A1 | 4/2007 | Kondo et al. | |

(Continued)

FOREIGN PATENT DOCUMENTS

WO    2015065669 A1    5/2015

OTHER PUBLICATIONS

International Search Report and Written Opinion for International Application No. PCT/US2014/059661 dated Jan. 19, 2015.

*Primary Examiner* — William C Vaughn, Jr.
*Assistant Examiner* — Stuart D Bennett
(74) *Attorney, Agent, or Firm* — Christopher P. Maiorana, PC (57) ABSTRACT

A video encoding method for encoding a stream of baseband video data. The stream of baseband video data is received as a plurality of coding units. Statistics of each coding unit in the plurality of coding units are gathered. A quantization parameter (QP) for each coding unit is determined from the corresponding statistics. The coding unit is trial encoded using the QP to generate a trial encoded coding unit; and the QP is updated based on the trial encoded coding unit. Trial encoding the coding unit and updating the QP are repeated until the trial encoded coding unit meets a predetermined criterion. Then the coding unit is final encoded using the updated QP to generate a final encoded coding unit.

21 Claims, 5 Drawing Sheets

(56) References Cited

U.S. PATENT DOCUMENTS

| | | |
|---|---|---|
| 2007/0153892 A1 | 7/2007 | Yin et al. |
| 2007/0263720 A1 | 11/2007 | He |
| 2008/0025392 A1* | 1/2008 | Lee .................. H04N 19/115 375/240.03 |
| 2008/0260042 A1 | 10/2008 | Shah et al. |
| 2009/0086816 A1 | 4/2009 | Leontaris et al. |
| 2009/0257489 A1 | 10/2009 | Karczewicz et al. |
| 2010/0265334 A1 | 10/2010 | Bhaskaran et al. |
| 2010/0290524 A1 | 11/2010 | Lu et al. |
| 2010/0315557 A1 | 12/2010 | Mathew et al. |
| 2011/0051806 A1* | 3/2011 | Lee .................. H04N 19/159 375/240.03 |
| 2011/0206115 A1 | 8/2011 | Okumura et al. |
| 2012/0002724 A1 | 1/2012 | Klim |
| 2012/0026394 A1 | 2/2012 | Maruyama |
| 2012/0039389 A1 | 2/2012 | Sjoberg et al. |
| 2012/0076202 A1 | 3/2012 | Brailovskiy |
| 2012/0183065 A1* | 7/2012 | Rusert .................. H04N 19/61 375/240.13 |
| 2012/0230400 A1 | 9/2012 | Lu et al. |
| 2012/0314764 A1 | 12/2012 | Tidemann et al. |
| 2013/0022102 A1 | 1/2013 | Casula |
| 2013/0121403 A1* | 5/2013 | Cote .................. H04N 19/176 375/240.03 |
| 2013/0235924 A1* | 9/2013 | Jang .................. H04N 19/436 375/240.01 |
| 2014/0002670 A1 | 1/2014 | Kolarov et al. |
| 2014/0254689 A1 | 9/2014 | Ho et al. |
| 2015/0063461 A1 | 3/2015 | Zheng |
| 2015/0208069 A1 | 7/2015 | Zheng et al. |
| 2015/0256840 A1* | 9/2015 | Sato .................. H04N 19/124 375/240.03 |

* cited by examiner

METHODS AND APPARATUSES FOR MULTI-PASS ADAPTIVE QUANTIZATION

TECHNICAL FIELD

Embodiments of the present invention relate generally to video encoding and examples of adaptive quantization for encoding are described herein. Examples include methods of and apparatuses for adaptive quantization utilizing feedback to ensure adequate visual quality.

BACKGROUND

Video encoders are often used to encode baseband video data; thereby reducing the number of bits used to store and transmit the video. In most cases the video data is arranged in coding units representing a portion of the overall baseband video data, for example: a frame; a slice; or a macroblock (MB). A typical video encoder may include a macroblock-based block encoder, outputting a compressed bitstream. This encoder may be based on a number of standard codecs, such as MPEG-2, MPEG-4, or H.264. A main bitrate and visual quality (VQ) driving factor in such example video encoders is typically the MB level quantization parameter (QP). A number of standard techniques may be used to select the QP for each MB.

In example video encoders, the QP determines a scale for encoding the video data. Generally, smaller QPs lead to larger amounts of data being retained during quantization processes and larger QPs lead to smaller amounts of data being retained during quantization processes.

DETAILED DESCRIPTION

Various example embodiments described herein include multi-pass adaptive quantization techniques. Examples of multi-pass adaptive quantization techniques described herein may advantageously support the provision (e.g., generation) of encoded bitstreams that have a more uniform visual quality. Example multi-pass adaptive quantization techniques may advantageously allow the properties of the codec (e.g. encoder) to be taken into account during the encoding procedure by providing feedback into the adaptive quantization process that may calibrate the adaptive quantization at any operating state of the encoder. This may result in a robust way of delivering the expected VQ throughout the encoded video data. In this way, uniform VQ may be achieved by encoding each coding unit (e.g. macroblock) with a suitable number of bits.

Baseband video streams typically include a plurality of pictures (e.g., fields, frames) of video data. Video encoding systems often separate these coding units further into smaller coding units such as macroblocks. Coding units include, but are not limited to, sequences, slices, macroblocks, pictures, group of pictures, and blocks.

Video encoders generally perform bit distribution (e.g. determine a number of bits to be used to encode respective portions of a video stream). The bit distribution may be designed to achieve a balanced visual quality. Typical approaches to bit distribution may utilize adaptive quantization methods operating on statistics extracted from the video while not accounting for the properties of the encoder itself. Typically, the baseband video is analyzed and statistics about the video are gathered. These statistics may be used to calculate the QP for each coding unit (e.g. MB). Once the QP for each MB is determined, the MB may be encoded. However, this approach may result in a less than reliable VQ. For example, areas of high texture or particular significance to viewer, such as faces, may be encoded with too little information to meet a desired VQ level.

Example methods and video encoders described herein include feedback in example adaptive quantization procedures. The feedback may advantageously improve VQ and/or produce a more even VQ across all or a portion of a bitstream.

Figure 1:
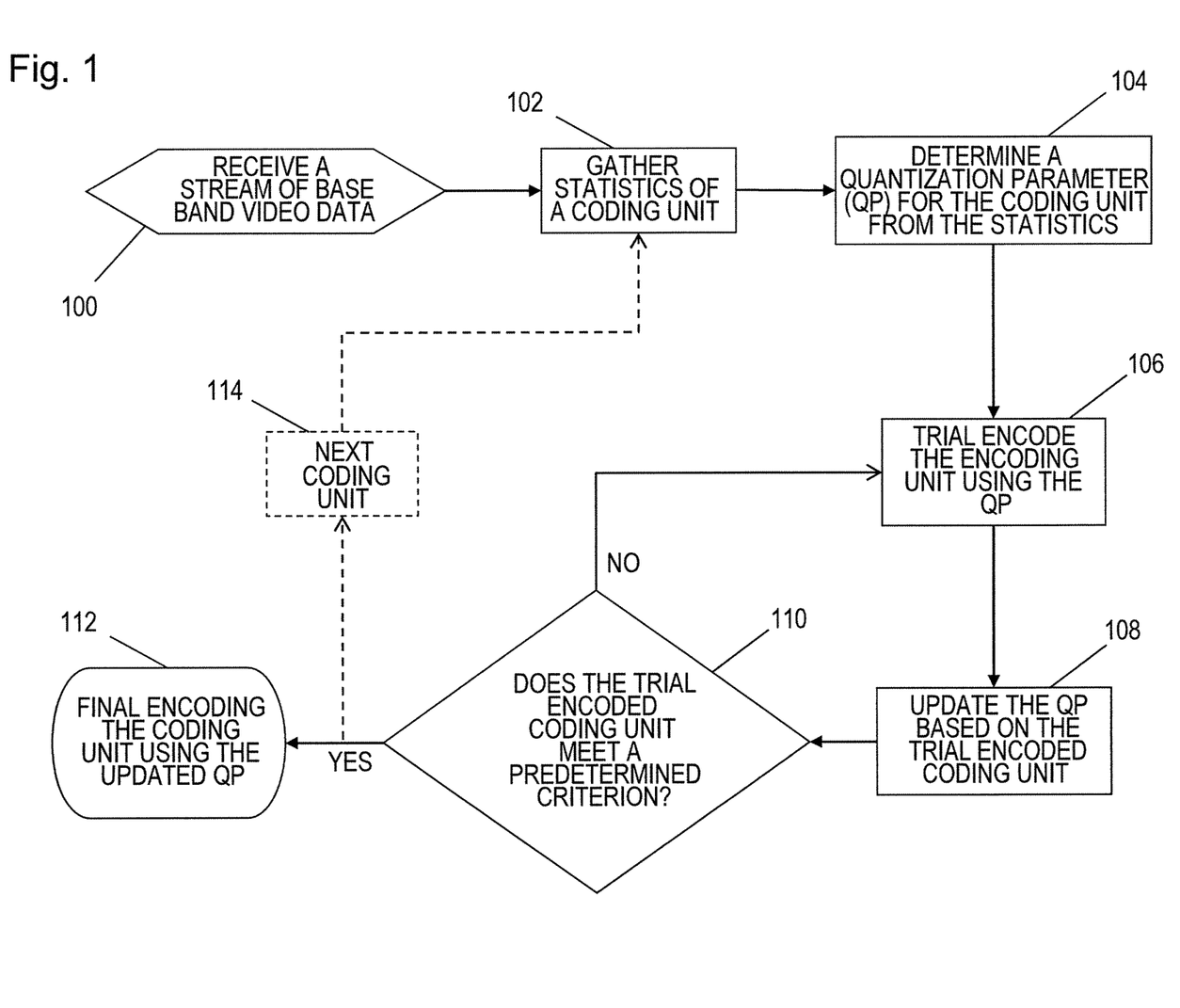
FIG. 1 is a flowchart of an example video encoding method including an example of a multi-pass adaptive quantization process according to the present disclosure.

FIG. 1 is a flowchart illustrating an example video encoding method described herein. In this example method a stream of baseband video data is received at act 100. The stream of baseband video data may be received directly from the video source (e.g., a video camera, etc.) or it may be accessed from a data storage unit or streamed from a network, such as the Internet. As noted above, the stream of baseband video data may include baseband video data representing a plurality of frames of video data and each of these frames may include a number of coding units, such as macroblocks.

For each coding unit, statistics of the coding unit are gathered at act 102, and an initial quantization parameter (QP) for the coding unit is determined from the corresponding statistics at act 104. Elements 102 and 104 may be performed using a number of methods known in the art.

The coding unit is trial encoded, at act 106, using the initial QP to provide (e.g., generate) a trial encoded coding unit. This trial encoding may be performed using any standard video encoding codec, such as MPEG-2, MPEG-4, or H.264. It may be useful to use the same codec for trial encoding the coding units as is to be used for the final encoding of the coding units; however, this may not be necessary in all examples. For example, it may be useful to use a less processor-intensive codec for the trial encoding process to increase throughput of the example video encoding method.

The resulting trial encoded coding unit is analyzed to update the QP at act 108. Updating the QP may include decoding and gathering trial statistics of the trial encoded coding unit similar to the statistics gathered for the baseband encoding unit in 102. These statistics may be compared to the baseband video data statistics to determine how well the trial encoded coding unit matches to the baseband coding unit. The QP may then be updated depending on whether the statistics from the trial encoded coding unit match the statistics from the baseband coding unit closely enough. If the statistics indicate that the VQ is likely to have been significantly degraded by the trial encoding process, then the QP for that coding unit may be decreased to increase the number of bits for that coding unit.

Another example embodiment is based on the number of bits of each coding unit within the encoded video data. As discussed above, the number of bits may scale inversely with the QP. It is noted, however, that for many video encoding codecs, the number of bits depends not only on the QP, but also on the complexity of the image being represented by the encoded coding unit. This may lead to a situation in which, for many codecs, encoded coding units with a similar bit rate may have a similarly perceived VQ. Thus, another example approach to ensuring adequate VQ may include attempting to approximately normalize the number of bits for each coding unit within a frame or other coding unit of encoded video data.

In an example embodiment, gathering trial statistics of the trial encoded coding unit may include comparing a bit size of a trial encoded coding unit to a target bit size. And then the updated QP may be determined by reducing the QP when the bit size is less than the target bit size, or increasing the QP when the bit size is greater than the target bit size.

The target bit size for the trial encoded coding units may be determined in a number of ways. One example approach to determining the target bit size may be to use the same target bit size for all of the trial encoded coding units in the frame. This common target bit size may be a preselected number based on experience, or it may be the average bit size for all of the trial encoded coding units within a frame or other coding unit.

Alternatively, the target bit size may vary for each trial encoded coding unit. These variable target bit sizes may be preselected based on one or more properties of the corresponding baseband coding unit, such as a common target bit size (e.g., frame average bit size) scaled using a weighting factor. The weighting factor may be calculated based on a property of the corresponding baseband coding unit, or may be based on a comparison of the respective images generated by the corresponding baseband coding unit and the trial encoded coding unit. One example of performing this comparison is to determine the distortion between the baseband coding unit and the trial encoded coding unit. Numerous methods known in the art may be used to calculate distortion, including, but not limited to: calculating a sum of absolute differences (SAD); calculating a sum of the squared differences (SSD); determining a structural similarity index baseband (SSIM), or combinations thereof.

The trial encoded coding unit may be evaluated to determine whether it meets a predetermined criterion in 110. This evaluation is illustrated in FIG. 1 as occurring following updating of the QP at act 108. This ordering is illustrative only, based on examples in which the predetermined criterion may be based on information gathered while updating the QP and where the updated QP may be useful to improve perceived VQ of the resulting final encoded video even when the predetermined criterion has been met; however, it is contemplated that the act 110 may occur before the QP is updated in some examples and that in such an embodiment the QP may not be updated once the predetermined criterion has been met. As illustrated in FIG. 1, if the trial encoded coding unit meets the predetermined criterion, the coding unit is final encoded, at act 112, and if there is another coding unit, as determined at act 114, the example process is repeated for that coding unit. This process may be iteratively performed until the predetermined criterion is met.

The predetermined criterion may involve a comparison between the baseband coding unit and the trial encoded coding unit, such as a distortion calculation being less than a predetermined value. Alternatively, the predetermined criterion may involve a comparison between the bit size of the trial encoded coding unit and the target bit size of the trial encoded coding unit, such as their absolute difference being less than a predetermined value or their ratio being within a predetermined range. The predetermined criterion may also or instead include that the QP of the coding unit has been updated a predetermined number of times. Further, it is contemplated that rather than a single predetermined criterion, there may be several criteria, any of which may cause the trial encoding and QP updating cycle (acts 106, 108, and 110) to end and the coding unit to be finally encoded using the most recently updated QP, e.g. the final QP. For example, in one example embodiment, the coding unit may be trial encoded and the QP updated until either the bit size of the trial encoded coding unit is close enough to its target bit size or the QP has been updated a predetermined number of times (e.g. four times).

Final encoding of the coding unit using the updated QP, at act 112, generates a final encoded coding unit. This final encoding may employ any coding standard, such as MPEG-2, MPEG-4, or H.264.

It is noted that many codecs not only utilize information within a frame of video data to reduce the size of the encoded video data (compared to the baseband video data), but may also utilize information about frames (or other coding units) that come either temporally before or after a current frame to further compress the video data, or frames (or other coding units) having a particular spatial relationship to the current coding unit. In video encoders using such codecs encoded frames of video data may be intra (I) frames, predictive (P) frames, or bidirectional predictive (B) frames. However, perceived VQ of a frame may be more affected by information within the frame itself. Additionally, I-frame encoding is often less processor-intensive than B- or P-frame encoding. Therefore, it may be useful to restrict the iterative trial encoding of the coding unit, at act 106, to I-frame encoding. Then any of I-frame, B-frame, or P-frame encoding may be used for final encoding of the coding unit, at act 112.

Figure 2A:
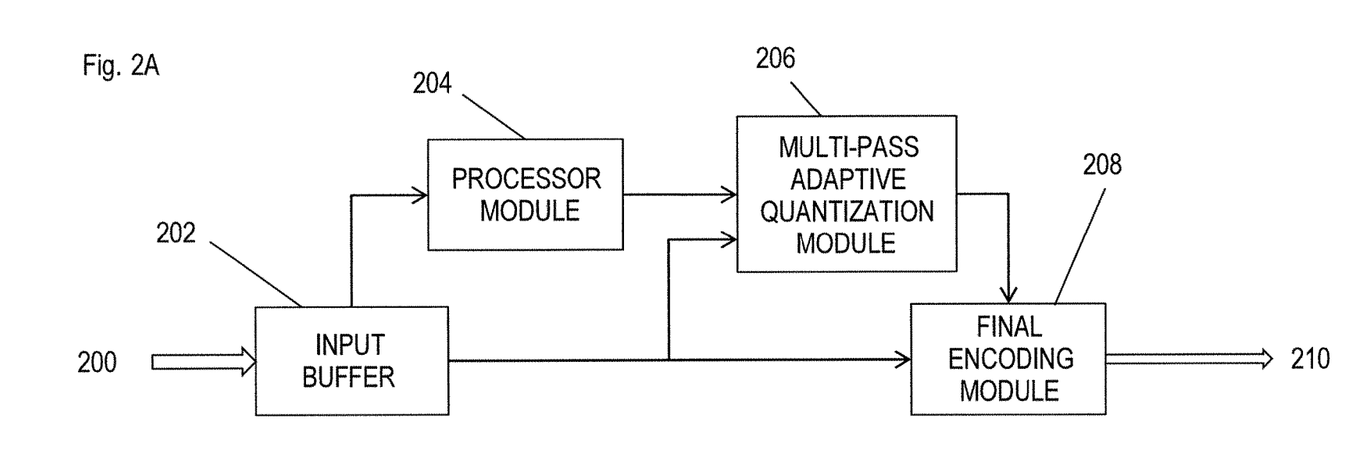
FIG. 2A is a schematic block diagram of an example video encoding system incorporating a multi-pass adaptive quantization module according to the present disclosure.
Figure 2B:
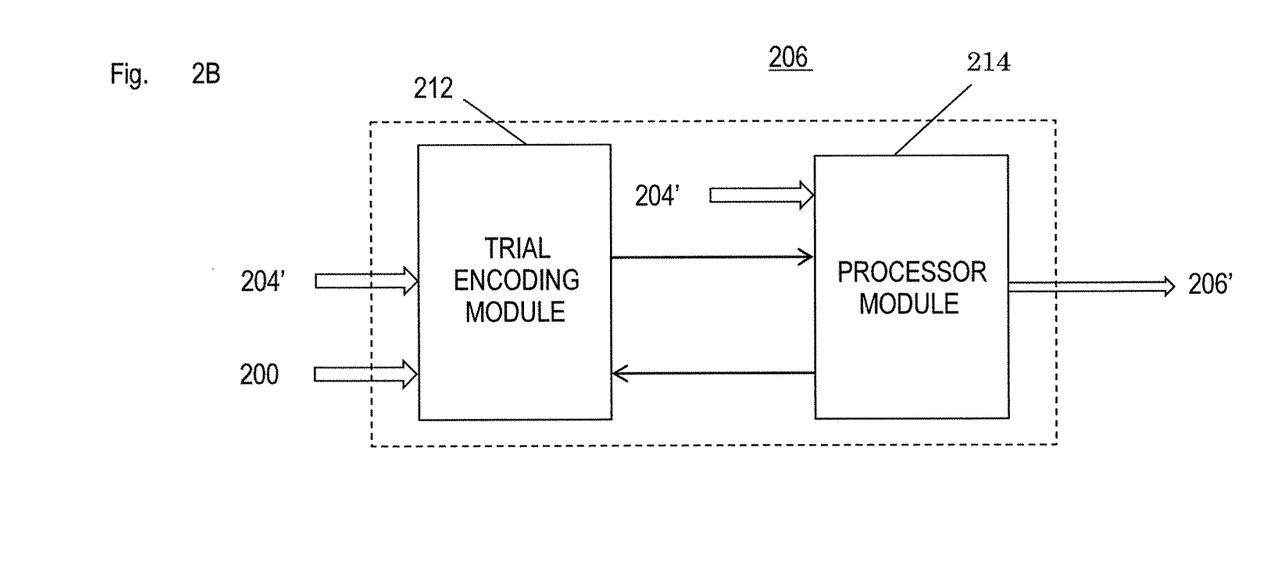
FIG. 2B is a schematic block diagram of an example multi-pass adaptive quantization module according to the present disclosure.

FIGS. 2A and 2B illustrate an example video encoding system. As illustrated in FIG. 2A, the example video encoder includes: input buffer 202 which receives a stream of baseband video data 200; a first processor module 204 coupled to input buffer 202; multi-pass adaptive quantization module 206 coupled to input buffer 202 and first processor module 204; and final encoding module 208 coupled to input buffer 202 and multi-pass adaptive quantization module 206. FIG. 2B illustrates multi-pass adaptive quantization module 206 in greater detail. Various arrows in these figures illustrate transfer of data between elements.

It is noted that the various elements of the example video encoder of FIGS. 2A and 2B may be built from electronic circuitry components and may include one or more application specific integrated circuits (ASICs). Alternatively, one or more of these elements may be implemented using one or more computing systems programmed to perform the functions of the element. The computing systems may include one or more processing units (e.g. processors) and electronic media encoded with executable instructions for performing the functions of one or more elements.

Input buffer 202 receives baseband video data 200 and transfers it to first processor module 204, multi-pass adaptive quantization module 206, and final encoding module 208. The transfer may precede one coding unit at a time in some examples. In various example embodiments, these coding units may be frames, slices, or MBs of video data. It is noted that in some example embodiments, input buffer 202 may be a frame grabber, which receives baseband video data one frame at a time. An example frame grabber may transfer baseband video data one frame at a time to first processor module 204, and multi-pass adaptive quantization module 206, but only transfer one slice or MB at a time to final encoding module 208. This may allow the first processor module to determine frame wide statistics and the multi-pass adaptive quantization module to use those frame wide statistics and/or generate post encoding frame wide statistics, even though the encoding is being done at a slice or MB level.

First processor module 204 is adapted to gather statistics of the received coding unit and determine a QP for the received coding unit from the gathered statistics. Examples of statistics that may be gathered and methods of determining a QP for the received coding unit from the gathered statistics are described in detail above with reference to the example method of FIG. 1.

Multi-pass adaptive quantization module 206 includes: trial encoding module 212 coupled to input buffer 202, and first processor module 204; and second processor module 214 coupled to first processor module 204, and trial encoding module 212. Transfer of data, such as baseband coding unit statistics and initial QPs from first processor module 204 to both trial encoding module 212 and second processor module 214 is illustrated by data arrows 204'. Data arrow 206' illustrates transfer of final QPs from multi-pass adaptive quantization module 206 to final encoder module 208

Trial encoding module 212 may encode the coding unit transferred from input buffer 202 using the current QP (either the initial QP transferred from first processor module 204 or the updated QP transferred from second processor module 214) to generate a trial encoded coding unit. As described in detail above, with reference to the example method of FIG. 1, trial encoding module 212 may include any standard codec, such as MPEG-2, MPEG-4, or H.264. Although not necessary, it may be useful for trial encoding module 212 to only be adapted to perform I-frame video encoding.

The trial encoded coding unit is passed to second processor module 214, which is adapted to determine if the trial encoded coding unit meets a predetermined criterion. If the trial encoded coding unit meets the predetermined criterion, second processor module 214 sets the final QP to be equal to the current QP; otherwise, second processor module 214 updates the QP based on the trial encoded coding unit. If the predetermined criterion was met, second processor module 214 transfers the final QP to final encoding module 208. If the predetermined criterion was not met, second processor module 214 transfers the updated QP to trial encoding module 212 and instructs it to repeat trial encoding the coding unit using the updated QP. Examples of these operations that may be performed by second processor module 214 are also discussed above with reference to the example method of FIG. 1.

Final encoding module 208 may encode the coding unit using the updated QP to generate a final encoded coding unit 210. This encoding module may be implemented using any standard video encoding module, such as an MPEG-2, MPEG-4, or H.264 encoding module. As noted above, whereas it may be useful in some examples for trial encoding module 212 to be an I-frame encoding module, final encoding module 208 may be an I-frame, P-frame, and/or B-frame encoding module.

Figure 3:
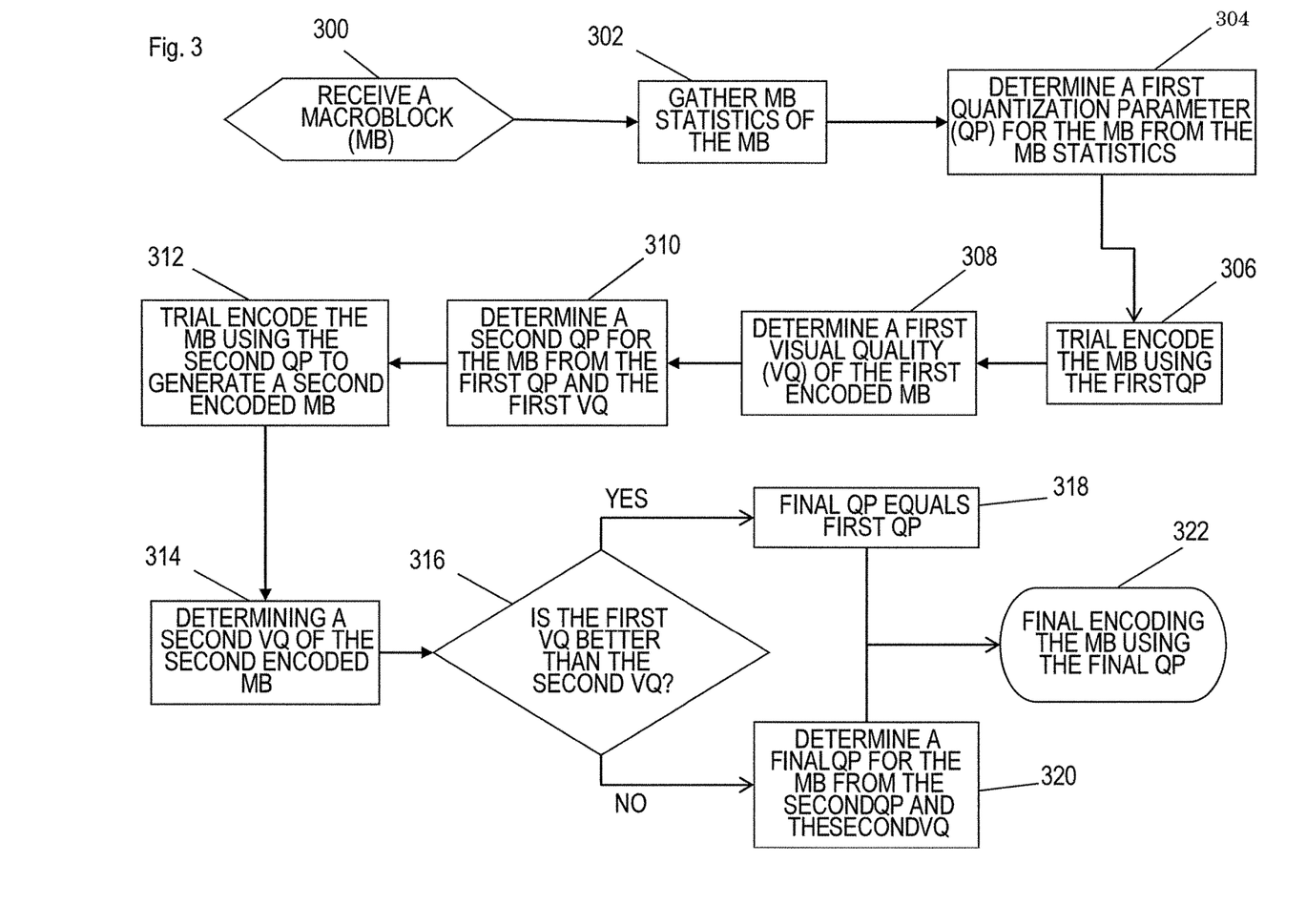
FIG. 3 is a flowchart illustrating an example video encoding method including a multi-pass adaptive quantization process according to the present disclosure.

FIG. 3 is a flowchart illustrating an example video encoding method for encoding a macroblock (MB) of baseband video data. While a macroblock is used as an example coding unit in FIG. 3, in other examples, other coding units may be used. Many portions of this example method are similar to those of the example embodiments of FIGS. 1, 2A, and 2B. The example method applies a two-pass adaptive quantization method for encoding a MB that may provide a streamlined approach to ensuring adequate VQ for the resulting encoded video stream. Although this example method is described in terms of encoding an MB, one skilled in the art may understand that it may be used for other sized or structured coding units of video data as well, and that this example method may be generalized to larger numbers of passes through the adaptive quantization procedure.

The MB is received, at act 300, and statistics of the MB are gathered, at act 302. These statistics are used to determine a first QP for the MB, at act 304 and the MB is trial encoded using the first QP, at act 306. These acts of the example method may be accomplished using any of the example procedures described herein with reference to the embodiments of FIGS. 1, 2A, and 2B.

A first VQ of the first encoded MB is determined, at act 308. As discussed herein, a number of approaches may be used to determine the first VQ, such as calculating distortion.

One example approach to determining the first VQ is to determine the bit size of the first encoded MB and then calculate a ratio of a target bit size to the bit size of the first encoded MB. This ratio is first VQ. The target bit size for the MB may be determined using any of the procedures described herein with reference to the example embodiments of FIGS. 1, 2A, and 2B. In this example embodiment, the closer the first VQ is to 1, the closer the bit size of the first encoded MB is to its target bit size and, thus, the better the first QP.

A second QP for the MB is determined from the first QP and the first VQ, at act 310. As noted above, increasing the QP reduces the number of bits used to encode the MB and, thus, typically lowers the resulting VQ. Likewise, decreasing the QP increases the number of bits used to encode the MB and typically increases the resulting VQ. Following the example approach for calculating the first VQ from at act 308 above, determining the second QP for the MB in at act 310 may include calculating a first delta QP, the first delta QP being proportional to the logarithm of the first VQ (e.g. the ratio of the target bit size to the bit size of the first encoded MB). The base of the logarithm and the proportionality constant are dependent on the specific codec used, for example, if an H.264 codec is used the logarithmic base is 2 and the proportionality constant is 6. This first delta QP is then subtracted from the first QP to calculate the second QP.

It is noted that in this example approach the first delta QP may sometimes have an artificially large absolute value. Therefore, it may be useful to bound the range of the first delta QP. This may be accomplished by comparing the first delta QP to a first delta QP range. If the first delta QP is less than the first delta QP range, the first delta QP may be set to a minimum first delta QP value; and if the first delta QP is greater than the first delta QP range, the first delta QP may be set to a maximum first delta QP value.

Once the second QP is calculated, the MB is trial encoded again using the second QP, in act 312, to generate a second encoded MB. As with the first trial encoding, in act 306, it may be useful for this second trial encoding to be an I-frame encoding.

A second VQ of the second encoded MB is determined, in act 314. The determination of the second VQ may be performed in the same manner as the determination of the first VQ in act 308. The second VQ is then compared to the first VQ, in act 316. If the first VQ is better than the second VQ, this indicates that the encoding of the MB is not well behaved. In this situation, it may be useful to set the final QP to be equal to the first QP, in act 318. If the first VQ is not better than the second VQ (which may be the most likely situation), the final QP for the MB may be determined from the second QP and the second VQ, in act 320.

Following the example approach for calculating the first VQ from in act 308 and for determining the second QP for the MB in act 310, determining the second VQ of the second encoded MB in in act 314 may include: determining a bit size of the second encoded MB; and calculating the ratio of the target bit size to the bit size of the second encoded MB, e.g. the second VQ. And determining the final QP for the MB in in act 320 (when the first VQ is not better than the second VQ) may include: calculating a second delta QP to be proportional to the logarithm of the second VQ and subtracting the second delta QP from the second QP to calculate the final QP.

As noted above with reference to the first delta QP, the second delta QP may have an artificially large absolute value in some examples. Therefore, it may be useful to bound the range of the second delta QP as well. This may be accomplished by comparing the second delta QP to a second delta QP range. (As it is expected in some examples that the bit size of the second trial encoded MB should be closer to the target bit size than the bit size of the first trial encoded MB, the second delta QP range may be smaller than the first delta QP range.) If the second delta QP is less than the second delta QP range, the second delta QP may be set to a minimum second delta QP value; and if the second delta QP is greater than the second delta QP range, the second delta QP may be set to a maximum second delta QP value.

Once the final QP has been determined in either in act 318 or 320, the MB is final encoded using the final QP, in act 322, to generate the final encoded MB. As discussed herein with reference to the example embodiments of FIGS. 1, 2A, and 2B, this final encoding may utilize I-frame, P-frame, or B-frame encoding.

Below is a specific example embodiment including pseudocode which may be used to implement the example embodiment of FIG. 3 using an H.264 codec based video encoder. This specific example is provided for demonstrative purposes and is not intended as limiting.

After the first trial encoding, the MB coded sizes may be collected. The MB target bits may be calculated by averaging the MB coded size of the entire frame. The rest of the example process as described herein involves adjusting the QPs for individual MBs such that the target bit budget may be achieved.

Pass 1 QP Adjustment $dqp1_N = 6*\log 2(mb\_target\_size/mb\_coded\_size\_P1_N);$ $if^*(mb\_coded\_size\_P1_N < mb\_target\_size/4)$ $dqp\_limit = 9;$ else $dqp\_limit = 6;$ $dqp1_N = CLIP(dqp\_limit, dqp1_N);$ $qp\_pass1_N = qp\_initial_N - dqp1_N;$      Equation 1

As shown in Equation 1, for all MBs within the coding unit (e.g. frame), which uses the initial QP values from the initial adaptive quantization as a starting point, the coded MB size is compared with the target bit size and a delta QP is derived ($dqp1_N$). This assumes a standard quantization curve as assumed for a given encoding format. For H.264, the encoded MB bit size is expected to drop to one half every time the QP is increased by 6. Next, a maximum delta QP limit is set (dqp_limit), if the encoded MB bit size is less than a quarter of the target, the QP limit is set to 9. It is set to 6 otherwise. The delta QP is clipped using the QP limit in both the positive and negative range. The QP delta is then applied to the starting QP value to seed the next trial encoding ($qp\_pass1_N$). It is to be understood that the thresholds and setpoint values described in Pass 1 may be other values in other examples.

Pass 2 QP Adjustment $s1 = mb\_coded\_size\_P1_N;$ $s2 = mb\_coded\_size\_P2_N;$ $if((s2>s1\&\&dqp1_N<0)II(s2<s1\&\&dqp1_N>0))$ $\{if(abs(s2-mb\_target\_size)<abs(s1-mb\_target\_size))$ $dqp2 = 0;$ else $dqp2 = -dqp1_N;\}$ else $\{gain = dqp1_N/\log 2(s2/s1);$ $gain = \max(2, \min(6, G));$ $dqp2 = (gain*\log 2(mb\_target\_size/s2);$ $if(s2 < mb\_target\_size/2)$ $dqp\_limit = 4;$ else $dqp\_limit = 6;$ $dqp2 = CLIP(dqp\_limit, dqp2);\}$ $qp\_pass2_N = qp\_initial_N - dqp1_N - dqp2;$      Equation 2

After the second trial encoding, two points on the quantization curve are known [$qp\_pass1_N$, $mb\_coded\_size\_P1_N$] and [$qp\_pass2_N$, $mb\_coded\_size\_P2_N$]. In some situations, due to some non-linearity within the encoding process, the point on the curve moves in the opposite direction than expected. In this case, the QP of the first or second trial encoding may be used depending on which pass produced an encoded MB bit size closer to the target bit size. For all other cases, those two points may be used to calculate the slope of the quantization curve (gain).

Once the slope is known, it may be used to adjust the QP for the final pass. If the MB coded size after the second trial encoding (pass 2) is less than half of the target, a maximum delta QP (dqp_limit) after pass 2 is set to 4; otherwise it is set to 6. The delta QP is clipped using the QP limit in both the positive and negative range.

The final QP ($qp\_pass2_N$) is then applied to produce the final encoded video. Again, it is to be understood that the threshold and setpoint values used in the pseudocode for Pass 2 herein may be set to other values in other examples.

Figure 4:
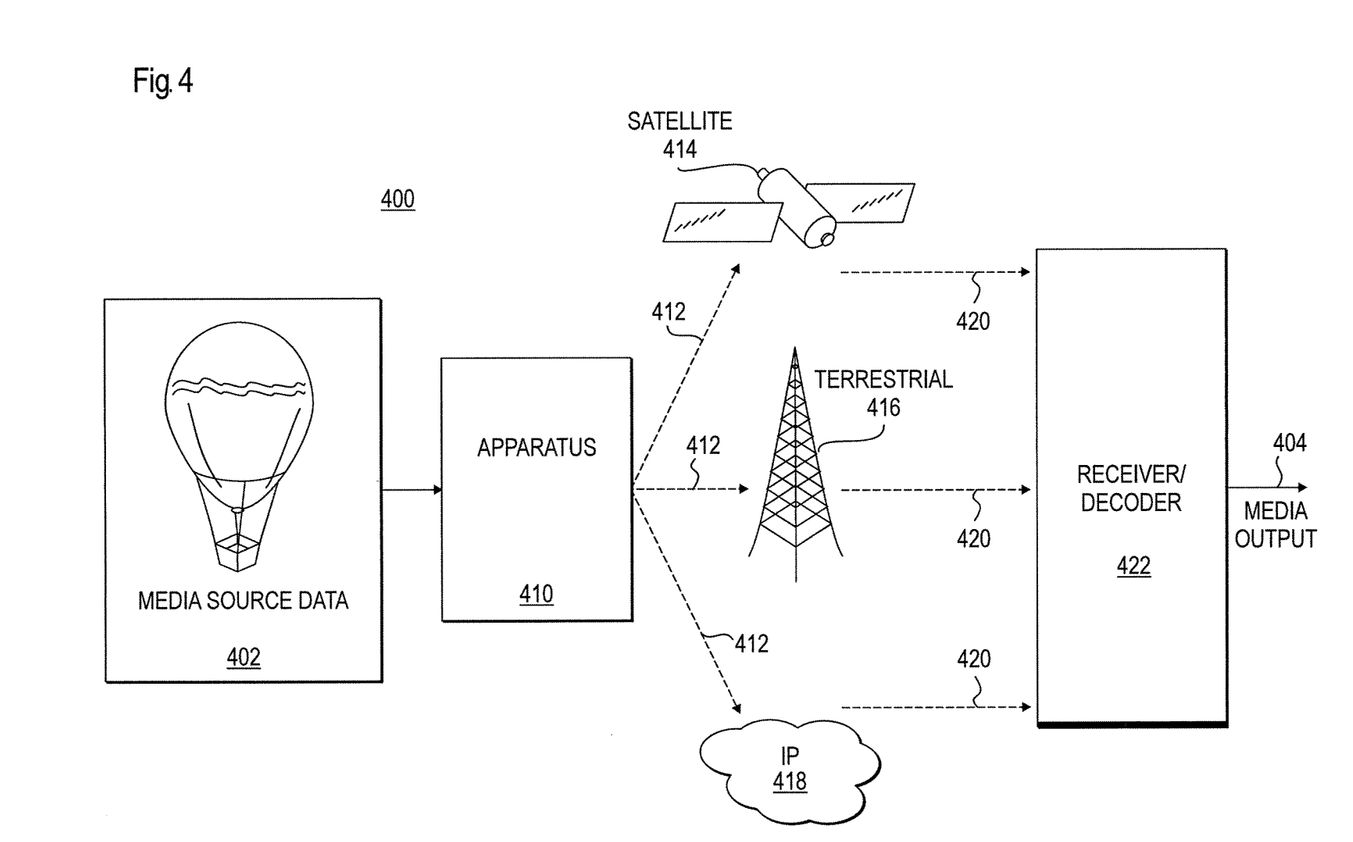
FIG. 4 is a schematic illustration of a media delivery system according to the present disclosure.

FIG. 4 is a schematic illustration of a media delivery system 400 in accordance with embodiments of the present invention. The media delivery system 400 may provide a mechanism for delivering a media source 402 to one or more of a variety of media output(s) 404. Although only one media source 402 and media output 404 are illustrated in FIG. 4, it is to be understood that any number may be used, and examples of the present invention may be used to broadcast and/or otherwise deliver media content to any number of media outputs.

The media source data 402 may be any source of media content, including but not limited to, video, audio, data, or combinations thereof. The media source data 402 may be, for example, audio and/or video data that may be captured using a camera, microphone, and/or other capturing devices, or may be generated or provided by a processing device. Media source data 402 may be analog and/or digital. When the media source data 402 is analog data, the media source data 402 may be converted to digital data using, for example, an analog-to-digital converter (ADC). Typically, to transmit the media source data 402, some mechanism for compression and/or encryption may be desirable. Accordingly, a video encoding system 410 may be provided that may filter and/or encode the media source data 402 using any methodologies in the art, known now or in the future, including encoding methods in accordance with video standards such as, but not limited to, H.264, HEVC, VC-1, VP8 or combinations of these or other encoding standards. The video encoding system 410 may be implemented with embodiments of the present invention described herein. For example, the video encoding system 410 may be implemented using the video encoding system 200 of FIG. 2A.

The encoded data 412 may be provided to a communications link, such as a satellite 414, an antenna 416, and/or a network 418. The network 418 may be wired or wireless, and further may communicate using electrical and/or optical transmission. The antenna 416 may be a terrestrial antenna, and may, for example, receive and transmit conventional AM and FM signals, satellite signals, or other signals known in the art. The communications link may broadcast the encoded data 412, and in some examples may alter the encoded data 412 and broadcast the altered encoded data 412 (e.g. by re-encoding, adding to, or subtracting from the encoded data 412). The encoded data 420 provided from the communications link may be received by a receiver 422 that may include or be coupled to a decoder. The decoder may decode the encoded data 420 to provide one or more media outputs, with the media output 404 shown in FIG. 4. The receiver 422 may be included in or in communication with any number of devices, including but not limited to a modem, router, server, set-top box, laptop, desktop, computer, tablet, mobile phone, etc.

The media delivery system 400 of FIG. 4 and/or the video encoding system 410 may be utilized in a variety of segments of a content distribution industry.

Figure 5:
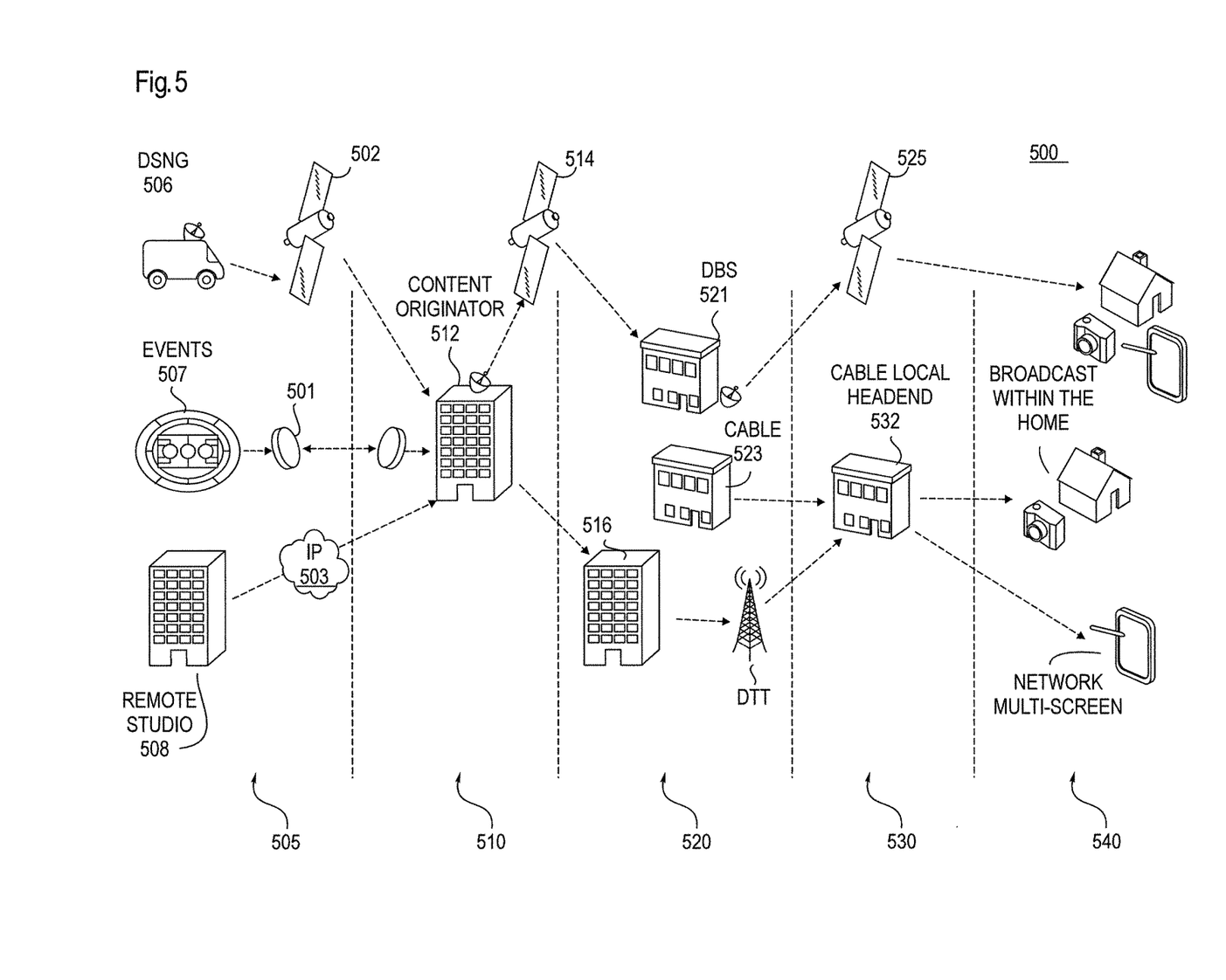
FIG. 5 is a schematic illustration of a video distribution system that may make use of video encoding systems described herein.

FIG. 5 is a schematic illustration of a video distribution system 500 that may make use of video encoding systems described herein. The video distribution system 500 includes video contributors 505. The video contributors 505 may include, but are not limited to, digital satellite news gathering systems 506, event broadcasts 507, and remote studios 508. Each or any of these video contributors 505 may utilize a video encoding system described herein, such as the video encoding system 200 of FIG. 2A, to encode media source data and provide encoded data to a communications link. The digital satellite news gathering system 506 may provide encoded data to a satellite 502. The event broadcast 507 may provide encoded data to an antenna 501. The remote studio 508 may provide encoded data over a network 503.

A production segment 510 may include a content originator 512. The content originator 512 may receive encoded data from any or combinations of the video contributors 505. The content originator 512 may make the received content available, and may edit, combine, and/or manipulate any of the received content to make the content available. The content originator 512 may utilize video encoding systems described herein, such as the video encoding system 200 of FIG. 2A, to provide encoded data to the satellite 514 (or another communications link). The content originator 512 may provide encoded data to a digital terrestrial television system 516 over a network or other communication link. In some examples, the content originator 512 may utilize a decoder to decode the content received from the contributor(s) 505. The content originator 512 may then re-encode data and provide the encoded data to the satellite 514. In other examples, the content originator 512 may not decode the received data, and may utilize a transcoder to change a coding format of the received data.

A primary distribution segment 520 may include a digital broadcast system 521, the digital terrestrial television system 516, and/or a cable system 523. The digital broadcasting system 521 may include a receiver, such as the receiver 422 described with reference to FIG. 4, to receive encoded data from the satellite 514. The digital terrestrial television system 516 may include a receiver, such as the receiver 422 described with reference to FIG. 4, to receive encoded data from the content originator 512. The cable system 523 may host its own content which may or may not have been received from the production segment 510 and/or the contributor segment 505. For example, the cable system 523 may provide its own media source data 402 as that which was described with reference to FIG. 4.

The digital broadcast system 521 may include a video encoding system, such as the video encoding system 200 of FIG. 2A, to provide encoded data to the satellite 525. The cable system 523 may include a video encoding system, such as video encoding system 200 of FIG. 2A, to provide encoded data over a network or other communications link to a cable local headend 532. A secondary distribution segment 530 may include, for example, the satellite 525 and/or the cable local headend 532.

The cable local headend 532 may include a video encoding system, such as the video encoding system 200 of FIG. 2A, to provide encoded data to clients in a client segment 440 over a network or other communications link. The satellite 525 may broadcast signals to clients in the client segment 540. The client segment 540 may include any number of devices that may include receivers, such as the receiver 422 and associated decoder described with reference to FIG. 4, for decoding content, and ultimately, making content available to users. The client segment 540 may include devices such as set-top boxes, tablets, computers, servers, laptops, desktops, cell phones, etc.

Accordingly, filtering, encoding, and/or decoding may be utilized at any of a number of points in a video distribution system. Embodiments of the present invention may find use within any, or in some examples all, of these segments.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular embodiments. Functionality may be separated or combined in procedures differently in various embodiments of the disclosure or described with different terminology. These and other variations, modifications, additions, and improvements may fall within the scope of the disclosure as defined in the claims that follow.

The invention claimed is:

1. A video encoding method for encoding a stream of baseband video data, the method comprising:
receiving the stream of baseband video data as a plurality of coding units; and for each coding unit in the plurality of coding units:
determining a quantization parameter for the coding unit;
trial encoding the coding unit using (i) the quantization parameter, (ii) a first encoding standard and (iii) solely intra-frame encoding to generate a trial encoded coding unit;
updating the quantization parameter based on the trial encoded coding unit;
repeating the trial encoding of the coding unit and the updating of the quantization parameter until the trial encoded coding unit meets a predetermined criterion; and
final encoding the coding unit using (i) the updated quantization parameter, (ii) a second encoding standard and (iii) inter-frame encoding to generate a final encoded coding unit, wherein the first encoding standard is a less processor-intensive encoding standard than the second encoding standard.

2. The method of claim 1, wherein each coding unit of the plurality of coding units is one of (i) a frame of the stream of baseband video data, (ii) a slice of the stream of baseband video data, (iii) a macroblock of the stream of baseband video data or (iv) a combination or sub-combination thereof.

3. The method of claim 1, wherein (i) the stream of baseband video data includes baseband video data including a plurality of frames, and (ii) each frame of baseband video data includes a plurality of the coding units.

4. The method of claim 1, wherein for each coding unit in the plurality of coding units, the final encoding of the coding unit includes at least one of:
predictive frame encoding the coding unit using the updated quantization parameter to generate the final encoded coding unit; and
bidirectional predictive frame encoding the coding unit using the updated quantization parameter to generate the final encoded coding unit.

5. The method of claim 1, wherein for each coding unit in the plurality of coding units,
(i) the trial encoding of the coding unit includes at least one of:
MPEG-2 encoding the coding unit using the quantization parameter to generate the trial encoded coding unit;
MPEG-4 encoding the coding unit using the quantization parameter to generate the trial encoded coding unit; and
H.264 encoding the coding unit using the quantization parameter to generate the trial encoded coding unit, and
(ii) the final encoding of the coding unit includes at least one of:
MPEG-2 encoding the coding unit using the updated quantization parameter to generate the final encoded coding unit;
MPEG-4 encoding the coding unit using the updated quantization parameter to generate the final encoded coding unit; and
H.264 encoding the coding unit using the updated quantization parameter to generate the final encoded coding unit.

6. The method of claim 1, wherein for each coding unit in the plurality of coding units, updating the quantization parameter includes:
determining a target bit size of the trial encoded coding unit as an average of individual bit sizes of a plurality of the trial encoded coding units of a trial encoded frame including the trial encoded coding unit; and
determining the updated quantization parameter for the coding unit by (i) reducing the quantization parameter when a bit size of the trial encoded coding unit is less than the target bit size and (ii) increasing the quantization parameter when the bit size of the trial encoded coding unit is greater than the target bit size.

7. The method of claim 1, wherein for each coding unit in the plurality of coding units, updating the quantization parameter includes:
calculating an average bit size of a plurality of the trial encoded coding units of a trial encoded frame including the trial encoded coding unit;
calculating a distortion between the trial encoded coding unit and a corresponding coding unit of the stream of baseband video data;
determining a target bit size of the trial encoded coding unit based on (i) the average bit size and (ii) the distortion;
comparing the bit size of the trial encoded coding unit to the target bit size of the trial encoded coding unit; and
determining the updated quantization parameter for the corresponding coding unit based on corresponding trial statistics gathered for the trial encoded coding unit and the quantization parameter by (i) reducing the quantization parameter when the bit size of the trial encoded coding unit is less than the target bit size and (ii) increasing the quantization parameter when the bit size of the trial encoded coding unit is greater than the target bit size.

8. The method of claim 7, wherein calculating the distortion between the trial encoded coding unit and the corresponding coding unit of the stream of baseband video data uses at least one of (i) a sum of absolute differences between the trial encoded coding unit and the corresponding coding unit of the stream of baseband video data, (ii) a sum of squared differences between the trial encoded coding unit and the corresponding coding unit of the stream of baseband video data and (iii) a structural similarity index between the trial encoded coding unit and the corresponding coding unit of the stream of baseband video data.

9. The method of claim 1, wherein for each coding unit in the plurality of coding units, updating the quantization parameter includes:
gathering trial statistics of the trial encoded coding unit; and
determining the updated quantization parameter for the coding unit based on the corresponding trial statistics and the quantization parameter.

10. The method of claim 9, wherein for each coding unit in the plurality of coding units,
(i) gathering trial statistics of the trial encoded coding unit includes:
comparing a bit size of the trial encoded coding unit to a target bit size, and (ii) determining the updated quantization parameter for the coding unit based on the corresponding trial statistics and the quantization parameter includes:
reducing the quantization parameter when the bit size of the trial encoded coding unit is less than the target bit size; and
increasing the quantization parameter when the bit size of the trial encoded coding unit is greater than the target bit size.

11. The method of claim 1, wherein the predetermined criterion includes:
the quantization parameter of the coding unit has been updated a predetermined number of times.

12. A video encoder comprising:
an input buffer configured to receive a stream of baseband video data one coding unit at a time;
a first processor (i) coupled to the input buffer and (ii) configured to determine a quantization parameter for the coding unit;
a trial encoding circuit (i) coupled to the input buffer and the first processor and (ii) configured to encode the coding unit using (a) the quantization parameter, (b) a first encoding standard and (c) solely intra-frame encoding to generate a trial encoded coding unit;
a second processor (A) coupled to the first processor and the trial encoding circuit and (B) configured to (i) determine if the trial encoded coding unit meets a predetermined criterion; and (ii) if the trial encoded coding unit meets the predetermined criterion, (a) set a final quantization parameter to the quantization parameter, otherwise (b) update the quantization parameter based on the trial encoded coding unit and instruct the trial encoding circuit to repeat the trial encoding of the coding unit using the updated quantization parameter; and
a final encoding circuit (i) coupled to the input buffer and the second processor and (ii) configured to encode the coding unit using (a) the updated quantization parameter, (b) a second encoding standard and (c) inter-frame encoding to generate a final encoded coding unit, wherein the first encoding standard is a less processor-intensive encoding standard than the second encoding standard.

13. The video encoder of claim 12, wherein (i) the stream of baseband video data includes baseband video data including a plurality of frames, and (ii) each frame of the plurality of frames includes a plurality of the coding units.

14. The video encoder of claim 12, wherein the final encoding circuit includes at least one of (i) a predictive frame encoding circuit and (ii) bidirectional predictive frame encoding circuit.

15. The video encoder of claim 12, wherein (i) the trial encoding circuit includes at least one of (a) an MPEG-4 encoding circuit and (b) an H.264 encoding circuit; and (ii) the final encoding circuit includes one of (a) an MPEG-4 encoding circuit and (b) an H.264 encoding circuit.

16. The video encoder of claim 12, wherein (A) the second processor is further configured to determine a target bit size as an average of individual bit sizes of a plurality of the trial encoded coding units of a trial encoded frame including the trial encoded coding unit, and (B) the updating of the quantization parameter includes (i) reducing the quantization parameter when a bit size of the trial encoded coding unit is less than the target bit size and (ii) increasing the quantization parameter when the bit size of the trial encoded coding unit is greater than the target bit size.

17. The video encoder of claim 12, wherein (A) the second processor is further configured to (i) calculate an average bit size of a plurality of the trial encoded coding units of a trial encoded frame including the trial encoded coding unit, (ii) calculate a distortion between the trial encoded coding unit and a corresponding coding unit of the stream of baseband video data, (iii) determine a target bit size of the trial encoded coding unit based on (a) the average bit size and (b) the distortion and (iv) compare the bit size of the trial encoded coding unit to the target bit size of the trial encoded coding unit and (B) the updating of the quantization parameter includes (i) reducing the quantization parameter when the bit size of the trial encoded coding unit is less than the target bit size and (ii) increasing the quantization parameter when the bit size of the trial encoded coding unit is greater than the target bit size.

18. A video encoding method for encoding a macroblock of baseband video data, the method comprising:
determining a first quantization parameter for the macroblock;
trial encoding the macroblock using (i) the first quantization parameter, (ii) a first encoding standard and (iii) solely intra-frame encoding to generate a first trial encoded macroblock;
determining a first visual quality of the first trial encoded macroblock;
repeating the trial encoding of the macroblock and the determining of the first visual quality until the first trial encoded macroblock meets a predetermined criterion;
determining a second quantization parameter for the macroblock from the first quantization parameter and the first visual quality;
trial encoding the macroblock using the second quantization parameter to generate a second trial encoded macroblock;
determining a second visual quality of the second trial encoded macroblock;
if the first visual quality is greater than the second visual quality, setting a final quantization parameter to the first quantization parameter, otherwise determining the final quantization parameter for the macroblock from the second quantization parameter and the second visual quality; and
final encoding the macroblock using (i) the final quantization parameter, (ii) a second encoding standard and (iii) inter-frame encoding to generate a final encoded macroblock, wherein the first encoding standard is a less processor-intensive encoding standard than the second encoding standard.

19. The method of claim 18, wherein the final encoding of the macroblock includes at least one of:
predictive frame encoding the macroblock using the final quantization parameter to generate the final encoded macroblock; and
bidirectional predictive frame encoding the macroblock using the final quantization parameter to generate the final encoded macroblock.

20. The method of claim 18, wherein
(i) the trial encoding of the macroblock using the first quantization parameter includes at least one of:
MPEG-4 encoding the macroblock using the first quantization parameter to generate the first trial encoded macroblock; and
H.264 encoding the macroblock using the first quantization parameter to generate the first trial encoded macroblock, (ii) the trial encoding of the macroblock using the second quantization parameter includes at least one of:
  MPEG-4 encoding the macroblock using the second quantization parameter to generate the second trial encoded macroblock; and
  H.264 encoding the macroblock using the second quantization parameter to generate the second trial encoded macroblock,
and (iii) the final encoding of the macroblock includes at least one of:
  MPEG-4 encoding the macroblock using the final quantization parameter to generate the final encoded macroblock; and
  H.264 encoding the macroblock using the final quantization parameter to generate the final encoded macroblock.

21. The method of claim 18, wherein
(i) determining the first visual quality of the first trial encoded macroblock includes:
  determining a first bit size of the first trial encoded macroblock; and
  calculating a first ratio of a target bit size to the first bit size of the first trial encoded macroblock,
(ii) determining the second quantization parameter for the macroblock includes:
  calculating a first delta quantization parameter, the first delta quantization parameter being proportional to a first logarithm of the first ratio of the target bit size to the first bit size of the first trial encoded macroblock;
  comparing the first delta quantization parameter to a first delta quantization parameter range;
  if the first delta quantization parameter is less than the first delta quantization parameter range, setting the first delta quantization parameter to a minimum first delta quantization parameter value;
  if the first delta quantization parameter is greater than the first delta quantization parameter range, setting the first delta quantization parameter to a maximum first delta quantization parameter value; and
  subtracting the first delta quantization parameter from the first quantization parameter to determine the second quantization parameter;
(iii) determining the second visual quality of the second trial encoded macroblock includes:
  determining a second bit size of the second trial encoded macroblock; and
  calculating a second ratio of the target bit size to the second bit size of the second trial encoded macroblock; and
(iv) determining the final quantization parameter for the macroblock includes:
  calculating a second delta quantization parameter, the second delta quantization parameter being proportional to a second logarithm of the second ratio of the target bit size to the second bit size of the second trial encoded macroblock;
  comparing the second delta quantization parameter to a second delta quantization parameter range;
  if the second delta quantization parameter is less than the second delta quantization parameter range, setting the second delta quantization parameter to a minimum second delta quantization parameter value;
  if the second delta quantization parameter is greater than the second delta quantization parameter range, setting the second delta quantization parameter to a maximum second delta quantization parameter value; and
  subtracting the second delta quantization parameter from the second quantization parameter to determine the final quantization parameter.

* * * * *